United States Patent
Sane et al.

(10) Patent No.: US 10,670,396 B2
(45) Date of Patent: Jun. 2, 2020

(54) MULTI-SENSOR TARGET LOCATION REGISTRATION

(71) Applicant: Sikorsky Aircraft Corporation, Stratford, CT (US)

(72) Inventors: Harshad S. Sane, Southbury, CT (US); Igor Cherepinsky, Sandy Hook, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 464 days.

(21) Appl. No.: 15/508,782

(22) PCT Filed: Sep. 8, 2015

(86) PCT No.: PCT/US2015/048813
§ 371 (c)(1),
(2) Date: Mar. 3, 2017

(87) PCT Pub. No.: WO2016/040239
PCT Pub. Date: Mar. 17, 2016

(65) Prior Publication Data
US 2017/0276482 A1 Sep. 28, 2017

Related U.S. Application Data

(60) Provisional application No. 62/047,345, filed on Sep. 8, 2014.

(51) Int. Cl.
*G01C 3/08* (2006.01)
*G01C 15/00* (2006.01)
(Continued)

(52) U.S. Cl.
CPC ............ *G01C 3/08* (2013.01); *F41G 1/35* (2013.01); *G01C 3/00* (2013.01); *G01C 5/00* (2013.01);
(Continued)

(58) Field of Classification Search
CPC ............ B64C 39/024; B64C 2201/141; B64C 2201/146; B64C 2201/145; G05D 1/101; G05D 1/042; G05D 1/0202; G05D 1/0088
See application file for complete search history.

(56) References Cited

U.S. PATENT DOCUMENTS 4,431,994 A 2/1984 Gemin
6,281,832 B1 8/2001 McElreath
(Continued)

OTHER PUBLICATIONS

ISR/WO, dated Dec. 4, 2015, PCT Application No. PCT/US15/48813, 18 pages.

*Primary Examiner* — Luke D Ratcliffe
(74) *Attorney, Agent, or Firm* — Cantor Colburn LLP

(57) ABSTRACT

A system for registering a target includes a first sensor, a second sensor, and a processor. The first sensor measures a plurality of ranges from a source to a target, and the second sensor obtains a plurality of location measurements of the source. The system further includes a processor configured for determining one or more weighting criteria associated with each one of the plurality of location measurements based on an estimated reliability of each one of the plurality of location measurements. The processor calculates a plurality of target location values based on the plurality of ranges measured by the first sensor and the plurality of locations measured by the second sensor and calculates an estimated target location value based on the plurality of target location values weighted according to the weighting criteria.

18 Claims, 2 Drawing Sheets

(51) Int. Cl.
*G01C 3/00* (2006.01)
*G01C 5/00* (2006.01)
*G01S 17/89* (2020.01)
*F41G 1/35* (2006.01)
*G01S 17/00* (2020.01)

(52) U.S. Cl.
CPC .......... *G01C 15/002* (2013.01); *G01S 17/003* (2013.01); *G01S 17/89* (2013.01)

(56) References Cited

U.S. PATENT DOCUMENTS

| | | |
|---|---|---|
| 6,462,703 B2 | 10/2002 | Hedrick |
| 7,145,501 B1 | 12/2006 | Manfred et al. |
| 7,409,293 B2 | 8/2008 | Hager et al. |
| RE42,891 E | 11/2011 | Diesel |
| 9,423,498 B1 * | 8/2016 | Brown .................... G08G 1/16 |
| 2008/0181487 A1 | 7/2008 | Hsu et al. |
| 2012/0307595 A1 | 12/2012 | Barger et al. |
| 2013/0107665 A1 * | 5/2013 | Fletcher .................. G01V 1/36 367/43 |
| 2013/0287290 A1 | 10/2013 | Owechko |
| 2016/0041561 A1 * | 2/2016 | Davies ................ G05D 1/0676 701/6 |
| 2016/0068267 A1 * | 3/2016 | Liu ...................... B64C 39/024 701/11 |

\* cited by examiner

MULTI-SENSOR TARGET LOCATION REGISTRATION

This application claims the benefit of PCT Application No. PCT/US15/48813, filed on Sep. 8, 2015, which in turn claims priority to U.S. provisional patent application Ser. No. 62/047,345, filed Sep. 8, 2014. The entire contents of PCT Application No. PCT/US15/48813 and U.S. provisional patent application Ser. No. 62/047,345 are incorporated herein by reference.

BACKGROUND OF THE INVENTION

Embodiments of the invention relate to location registration and in particular to multi-sensor target location registration.

Inertial registration of targets is a method of attributing global coordinates, such as latitude, longitude, altitude, and earth-centered-earth-fixed, to range data using an aircraft position and sensor information, such as LIDAR ray information. Such registration typically involves calculating a target location based on LIDAR information combined with an altitude measurement, such as a mean-sea-level (MSL) altitude measurement. However, measurement errors result in inaccurate registration points. For example, barometric altitude errors are forward-velocity dependent, and in rotorcraft they are subject to fluctuations due to rotor downwash, fuselage/empennage wakes, etc.

BRIEF DESCRIPTION OF THE INVENTION

Embodiments of the invention relate to a system for registering a target. The system includes a first sensor for measuring a plurality of ranges from a source to a target. The first sensor is configured for measuring the plurality of ranges based on at least one of the source moving among a plurality of different locations and the first sensor taking measurements at a plurality of different times. The system includes a second sensor for obtaining a plurality of location measurements of the source based on at least one of the source moving among the plurality of different locations and the second sensor obtaining measurements at the plurality of different times. The system further includes a processor configured for determining one or more weighting criteria associated with each one of the plurality of location measurements based on an estimated reliability of each one of the plurality of location measurements. The processor is configured for calculating a plurality of target location values based on the plurality of ranges measured by the first sensor and the plurality of locations measured by the second sensor. The processor is further configured to calculate an estimated target location value based on the plurality of target location values weighted according to the weighting criteria.

In the above embodiment, or in the alternative, calculating the estimated target location based on the plurality of target location values weighted according to the weighting criteria may include generating a weighted average based on the plurality of target location values and the weighting criteria.

In the above embodiments, or in the alternative, the first sensor may detect a range above ground level, the second sensor detects an altitude above mean sea level (MSL), and the estimated target location value includes an MSL altitude of the target.

In the above embodiments, or in the alternative, the first sensor may be a LIDAR sensor system and the second sensor may be an altitude sensor.

In the above embodiments, or in the alternative, the system may include a third sensor for detecting a plurality of secondary location measurements of the source. The plurality of secondary location measurements may correspond to an altitude of the third sensor above ground level. The processor may be configured to calculate the estimated target location based on the plurality of secondary location measurements.

In the above embodiments, or in the alternative, the third sensor may be radar.

In the above embodiments, or in the alternative, the first and second sensors may be located on an aircraft, the target location may be a terrain feature, and the moving among the plurality of locations may include the aircraft flying over terrain.

In the above embodiments, or in the alternative, the weighting criteria may include a speed of the source at a time that each of the plurality of location measurements is obtained.

Additional embodiments of the invention relate to a method of registering a location of a target. The method includes measuring, by a first sensor, a plurality of ranges from a source to a target, the plurality of ranges being based on at least one of the source moving among a plurality of different locations and the first sensor taking measurements at a plurality of different times. The method includes measuring, by a second sensor, a plurality of location measurements based on at least one of the source moving among the plurality of different locations and the second sensor obtaining measurements at the plurality of different times. The method includes determining one or more weighting criteria associated with each one of the plurality of location measurements based on an estimated reliability of each one of the plurality of location measurements, calculating a plurality of target location values for the target based on the plurality of ranges and the plurality of location measurements, and calculating an estimated location value of the target based on the plurality of target location values weighted according to the weighting criteria.

In the above embodiments, or in the alternative, calculating the estimated target location based on the plurality of target location values weighted according to the weighting criteria includes generating a weighted average based on the plurality of target location values and the weighting criteria.

In the above embodiments, or in the alternative, the first sensor may detect a range above ground level, the second sensor may detect an altitude above mean sea level (MSL), and the estimated target location value may include an MSL altitude of the target In the above embodiments, or in the alternative, the method may include detecting, by a third sensor, a plurality of secondary location measurements of the source, said plurality of secondary location measurements corresponding to an altitude of the third sensor above ground level. The estimated location value may be calculated based on the plurality of secondary location measurements.

Additional embodiments of the invention relate to a vehicle including a propulsion system to move the vehicle among a plurality of locations, a first sensor, a second sensor, and a processor. The first sensor measures a plurality of ranges from the vehicle to a target based on at least one of the vehicle moving among a plurality of different locations and the first sensor taking measurements at a plurality of different times. The second sensor may obtain a plurality of location measurements of the vehicle based on at least one of the vehicle moving among the plurality of different locations and the second sensor obtaining measurements at the plurality of different times. The processor may be configured to determine one or more weighting criteria associated with each one of the plurality of location measurements based on an estimated reliability of each one of the plurality of location measurements. The processor may be configured for calculating a plurality of target location values based on the plurality of ranges measured by the first sensor and the plurality of locations measured by the second sensor. The processor may be further configured to calculate an estimated target location value based on the plurality of target location values weighted according to the weighting criteria.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Conventional location registration systems and methods are subject to inaccuracies due to various criteria that affect location measurements, such as MSL altitude measurements. Embodiments of the invention relate to the correction of target location values using multiple different types of sensors.

Figure 1:
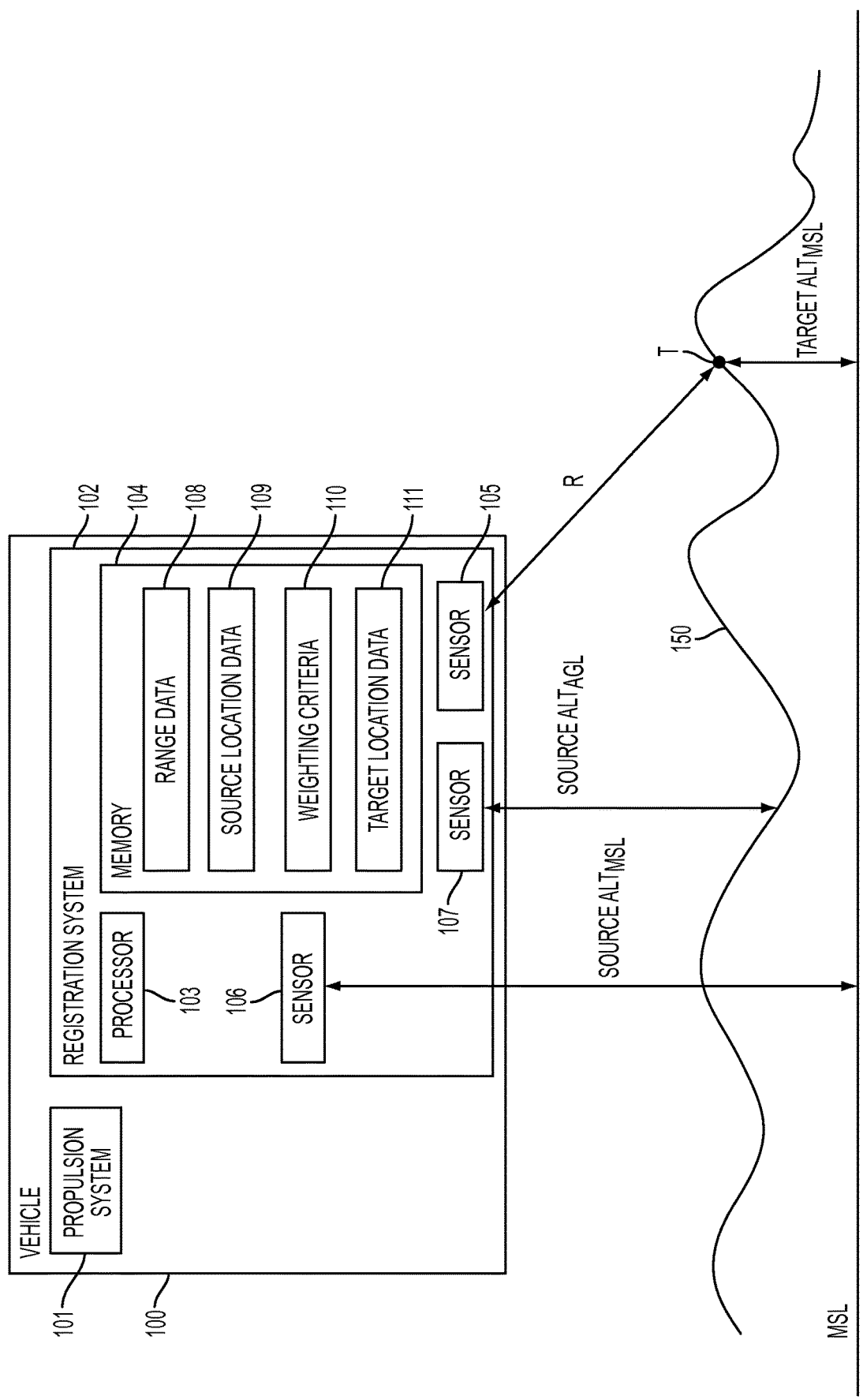
FIG. 1 illustrates a system for registering a target according to an embodiment of the invention.

FIG. 1 illustrates a system for registering a target location according to an embodiment of the invention. The system includes a vehicle 100 having a propulsion system 101 to move the vehicle among a plurality of locations. The propulsion system 101 may include any type of propulsion device, mechanism, or system including engines, propellers, or any other type of propulsion mechanisms. A registration system 102 may be located in or on the vehicle 101 and may include a first sensor 105, a second sensor 106, and a processor 103. The first sensor 105 may measure a range R from the sensor 105 to a target T located on terrain 150. As the vehicle 100 moves among a plurality of locations, the first sensor 105 measures a plurality of ranges from the vehicle 100 to the target T. In addition, or in the alternative, the first sensor 105 may measure the plurality of ranges by measuring the range R at a plurality of different times. In one embodiment, the first sensor 105 is a LIDAR sensor or LIDAR system that emits light to the target, receives reflected light from the target, and stores range data representing the range R based on characteristics of the reflected light. In one embodiment, range data 108 is stored in memory 104. In one embodiment, range data 108 measured by the sensor 105 is stored in memory 104.

The second sensor 106 obtains a plurality of location measurements of the vehicle 100 based on at least one of the vehicle 100 moving among the plurality of different locations and the second sensor 106 obtaining measurements at the plurality of different times. In one embodiment, the second sensor 106 is an altitude sensor that measures an altitude above mean sea level (MSL) (SourceAltMSL), or any other reference plane. In one embodiment, the second sensor is a barometric altimeter that measures the altitude based on a measured barometric pressure. The source location data 109 collected by the second sensor 106, such as MSL altitude measurements, may be stored in memory 104. In one embodiment, the first sensor 105 detects a range above ground level, and the second sensor detects 106 an MSL altitude.

In embodiments of the invention, the second sensor 106 has weighting criteria associated with the measurements of the second sensor 106. The weighting criteria are criteria that affect the reliability of the measurements of the second sensor 106, or criteria that affect a confidence level in the measurements of the second sensor 106. For example, in an embodiment in which the second sensor 106 is a barometric altimeter, the weighting criteria may include a speed of the vehicle 100 when the measurement is taken. In such an embodiment, an increased speed of the vehicle 100 may decrease a reliability of the measurement. The measurements of the second sensor 106 may have one or more associated weighting criteria, and the weighting criteria 110 may be stored in memory 104.

In embodiments of the invention, the processor 103 determines the weighting criteria associated with each one of the location measurements of the second sensor 106 to generate a weight value for each measurement. The weight value may reflect the reliability of the measurement or confidence level in the accuracy of the measurement. The processor 103 may then calculate a plurality of target location values for each separate target T based on the plurality of ranges measured by the first sensor 105 and the plurality of locations measured by the second sensor 106. Each of the target location values may be weighted based on the weight values of the corresponding location measurements of the second sensor 106, or each target location value may have an associated weight value based on the weight value of a corresponding location measurement used to generate the target location value. In one embodiment, the target location data 111 made up of multiple target location values is stored in memory 104.

The processor 103 then calculates an estimated target location value based on the plurality of target location values weighted according to the weighting criteria. The estimated target location value may be a single value or set of values identifying a single location of the target location T. For example, in an embodiment in which the plurality of target location values includes three different coordinate values, the estimated target location value would be a single set of coordinates identifying the location of the target T. In one embodiment, the estimated target location value includes MSL coordinate values, or an MSL altitude value.

In one embodiment, the processor 103 calculates the estimated target location value based on the plurality of target location values weighted according to the weighting criteria by generating a weighted average based on the plurality of target location values and the weighting criteria. For example, in an embodiment in which two different target location values exist for a target location T, a target location value having a higher associated weight value may be given a greater weight than a target location value having a lower associated weight value, such that the estimated target location value is closer to the target location value having the higher associated weight value than to the target location value having the lower weight value. In another embodiment, a target location having a weight value below a predetermined threshold may be discarded from a calculation of the estimated target location value.

In one embodiment, the processor 103 uses location data obtained by a third sensor 107 to calculate the estimated location value of the target location T. In one embodiment, the third sensor 107 detects an altitude above ground level (SourceAltAGL) and the second sensor 106 detects an MSL altitude. In one embodiment, the third sensor 107 is a radar assembly.

In one embodiment, the third sensor 107 obtains an AGL altitude measurement, and the processor 103 determines whether an expected error of the AGL altitude measurement (such as a predetermined expected error based on device specifications), plus the predicted error of the estimated target location altitude based on the weighted average of the plurality of target location values is greater than a present MSL altitude measurement of the second sensor 106. If so, then a new estimated target location value may be calculated based on an average of the previously-calculated weighted average plus the MSL altitude measurement presently measured by the second sensor 106. By this process, the target location values of a target location T may be continually updated and corrected to reduce and eliminate errors as new measurements are obtained.

It should be noted that while FIG. 1 illustrates lines from the sensors 105 and 107 to different location along the terrain 150, it is understood that a process that generates the estimated target location T altitude based on the third sensor 107 is based on AGL altitude measurements above the target location T. For example, the vehicle 100 may move with respect to the terrain 150 to take the range measurements R to the target location T at one time and to take the AGL altitude measurements of the target T at another time.

While an embodiment has been illustrated in FIG. 1 in which the entire registration system 102 is located in the vehicle 100, embodiments also encompass registration systems having some portions or elements located remotely from the vehicle. For example, one or more of the sensors 105 to 107, the memory 104, and the processor 103 may be land-based. As one example, the registration may collect data with the sensors 105 to 107, store the data in memory, and transmit the data to a land-based computer to perform the above-described target location registration calculations. In another embodiment, the third sensor 107, which may be a radar device, may be a land-based sensor, while the first and second sensors 105 and 106 are vehicle-based. A few examples are provided, but embodiments encompass any combination of land-based and vehicle based sensors of a target-location registration system.

Figure 2:
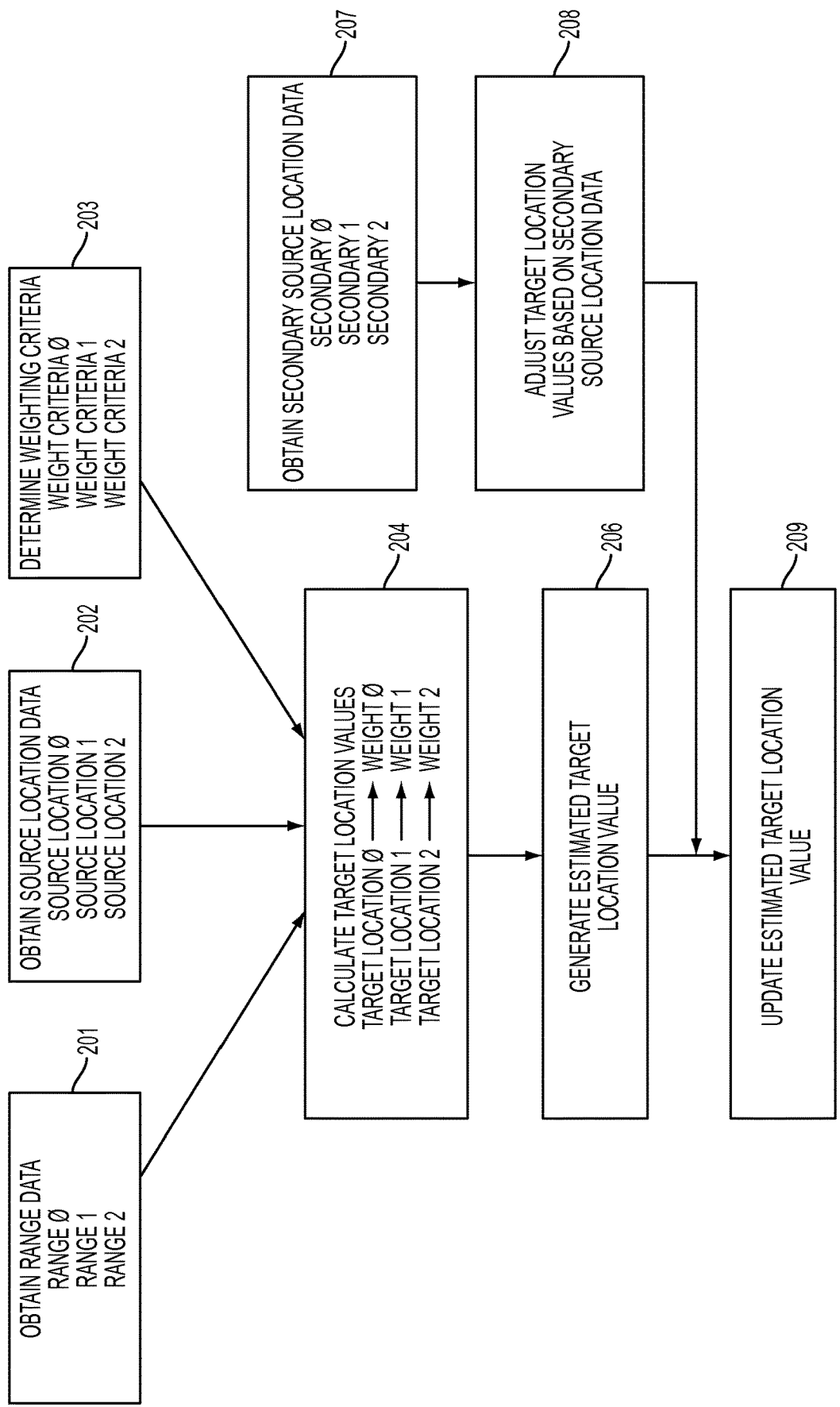
FIG. 2 is a flow diagram of a method for registering a target according to one embodiment.

FIG. 2 is a flow diagram illustrating a method of registering a target location according to an embodiment of the invention. In block 201, range data is obtained. The range data may be a range from a source sensor on a vehicle to a target location on terrain. The range may be obtained via a LIDAR sensor or system, or by any other range-measuring sensor.

In block 202, source location data is obtained. In particular, an altitude sensor of a vehicle may obtain a measurement for the MSL altitude of the vehicle. The source location data may be altitude data obtained by a barometric altimeter, or by any other device or sensor capable of measuring an MSL altitude.

In block 203, weighting criteria are determined. For example, in an embodiment in which a speed of a vehicle on which the barometric altimeter is mounted affects the accuracy of the measurements of the barometric altimeter, a processing system may store the speed at which each MSL altitude measurement was taken as WeightCriteria 0, 1, and 2.

In block 204, target location values are calculated based on the measurements from processes 201 and 202, and the target location values are associated with weight values based on the weighting criteria of block 203. In an embodiment in which the source location data obtained in block 202 is MSL altitude data, the target location values may be MSL altitude values of the target location on the terrain.

In block 206, an estimated target location value is generated based on a plurality of weighted target location values corresponding to the same target location. For example, blocks 201 and 202 may be performed at different times and from different locations of source, resulting in the generation of a plurality of range data measurements and source location data measurements for the target location. The multiple target location values are weighted and the combination of values is used to generate the estimated target location value. In one embodiment, the estimated target location value is calculated based on a weighted average of the plurality of target location values.

In one embodiment, secondary source location data from another sensor or system is obtained in block 207. For example, in an embodiment in which location data obtained in block 202 is MSL altitude data of a source or vehicle, the secondary source location data may be AGL altitude data from a radar assembly. In block 208, target location values may be adjusted based on the secondary source location data. For example, an expected error of the secondary source location data (the secondary source location data being an AGL altitude value) may be added to the predicted error of the estimated target location value (the estimated target location value being an MSL altitude value) and the sum compared to the predicted error value of a presently-measured source location data value, such as a present barometric altimeter measurement. If the sum is greater than the predicted error value of the presently-measured source location data value, the estimated target location value (generated in block 206) may be averaged with an estimated target location value based on the presently-measured source location data to update the estimated target location value in block 209. Alternatively, if the sum is less than the predicted error value of the presently-measured source location data value, the estimated target location value (generated in block 206) may not be averaged with an estimated target location value based on the presently-measured source location data. By this method, the registration of target locations in terrain may be performed and continually updated based on new measurements.

Embodiments of the invention are described in additional detail below. In one embodiment, the flight profile of an aircraft, such as the vehicle 100 of FIG. 1, including first, second and third sensors, such as the sensors 105 to 107 of FIG. 1 may be given by horizontal position x, velocity profile V(x), actual MSL altitude z(x), measured inertial position $x_{EGI}(x)$ and barometric attitude above MSL $z_{bar}(x)$. The first sensor may be a LIDAR and the laser ranger finder have a ray with actual elevation angle $\tilde{\lambda}(x)$ and measured elevation angle of $\lambda(x)$, with detected range of $r(x, \lambda(x))$, so that the horizontal and vertical inertial location of the detected point is given by the following:

$$x_p^*(x) = x + r(x, \lambda(x)) \cos \lambda(x), \quad (1)$$

$$z_p^*(x) = z(x) + r(x, \lambda(x)) \sin \lambda(x). \quad (2)$$

Due to sensor error, the aircraft registers this point at the following location:

$$x_p(x) = x_{EGI}(x) + r(x, \lambda(x)) \cos \lambda(x), \quad (3)$$

$$z_p(x) = z_{bar}(x) + r(x, \lambda(x)) \sin \lambda(x). \quad (4)$$

Sensor errors in barometric altitude and horizontal position can be characterized by an accuracy and noise. In one embodiment, the accuracy of the sensors varies according to forward airspeed according to the following equations:

$$x_{EGI}(x)=x+\varepsilon_{EGI}(V(x)), \tag{5}$$

$$z_{bar}(x)=z(x)+\varepsilon_{bar}(V(x)). \tag{6}$$

In the above equations (5) and (6), $\varepsilon_{EGI}(V)$ and $\varepsilon_{bar}(V)$ represent error functions that are known as a specification of the sensor.

During operation of the target location registration system according to embodiments of the invention, the same location on the terrain is detected at multiple locations along the flight path of the aircraft. Accordingly, a set of aircraft locations $X(\ )$ that return a LIDAR return for a particular location $x_p^0$ on the terrain is defined according to the following formula:

$$X(x_p^0)=\{\text{all } x_{EGI} \text{ such that } x_p(x)=x_p^0\}. \tag{7}$$

In a practical implementation—this set would be constructed for a terrain "cell" on the ground—i.e. set of all aircraft locations along the flight path that provide LIDAR hits on a particular area on the terrain. This area would be chosen larger than the predicted error in horizontal location $\varepsilon_{EGI}(V(x))$. The estimate of terrain height above MSL at point $x_p^0$ can be constructed by averaging all measurements of $z_p(x_{EGI})$ taken from all points $x_{EGI}$ in this set $x(x_p^0)$. In particular, this average may be constructed by a weighted average of these measurements where the weights are chosen to be inversely proportional to the values of $\varepsilon_{bar}(V(x))$. This method provides a way of discarding measurements that may have large inaccuracies. The weight average may be designated as $\hat{z}(x_p^0)=\langle z_p(x)|w(x)\rangle$ over all $x \in X(x_p^0)$, where the weights $w(x)$ is some function of $$\frac{1}{s_{bar}(V(x))}.$$

$\langle | \rangle$ is a symbol for weighted sum or norm with weights $w(x)$. The predicted error in this altitude is given by $e_{\hat{z}}(x_p^0)=\langle \varepsilon_{bar}(V(x))|w(x)\rangle$.

Next, if the current aircraft location $x_{EGI}$ happens to have a non-empty LIDAR hit set $X(x_{EGI})$, the predicted aircraft MSL altitude at the current location is given by $\hat{z}(x_{EGI}(x))+z_{rad}(x)$ where $z_{rad}(x)$ is the radar altitude as measured by the third sensor, which may be a radar altitude sensor. A comparison of the predicted altitude to the current measurement of MSL altitude based on barometric altitude $z_{bar}(x)$ gives an error in $z_{bar}(x)$. If the predicted error in $\hat{z}(x_{EGI}(x))$ (namely $e_{\hat{z}}(x_{EGI}(x))$) combined with expected error (accuracy) in radar altitude $z_{rad}(x)$ is greater than the expected error in $z_{bar}(x)$, then the MSL altitude measurement can be constructed based on a weighted average of $\hat{z}(x_{EGI}(x))+z_{rad}(x)$ and $z_{bar}(x)$.

Expressed mathematically:

$$\hat{z}_{MSL}(x_{EGI}) = \tag{8}$$

$$\begin{cases} \left\langle z_{bar}, \hat{z}, z_{rad} \middle| \frac{1}{s_{bar}}, \frac{1}{e_{\hat{z}}}, \frac{1}{e_{rad}} \right\rangle & \text{if } e_{\hat{z}}+e_{rad}<\varepsilon_{bar} \text{ and } \chi(x_{EGI}) \neq \emptyset \\ z_{bar}(x) & \text{if } (e_{\hat{z}}+e_{rad}>\varepsilon_{bar}) \text{ or } \chi(x_{EGI}) = \emptyset \end{cases}$$

In one embodiment, $z_{bar}$ in equation (4) may be replaced by $\hat{z}_{MSL}$ in equation (8), there by correcting LIDAR registration errors in $z_p(x)$ and correcting all subsequent LIDAR inertial registration errors. While the above example relates to two axes of a coordinate system, x and z, embodiments encompass examples and systems implemented in a coordinate system having any number of axes, such as a three-axis coordinate system.

Technical effects of embodiments of the invention include improving an accuracy of target location values when registering locations on terrain and automatically correcting range registration and altitude values based on range sensors, such as LIDAR sensors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for registering a target, comprising:
   a first sensor for measuring a plurality of ranges from a source to a target, the first sensor configured for measuring the plurality of ranges based on at least one of the source moving among a plurality of different locations and the first sensor taking measurements at a plurality of different times;
   a second sensor comprising a barometric altimeter for obtaining a plurality of barometric altitude location measurements of the source based on at least one of the source moving among the plurality of different locations and the second sensor obtaining measurements at the plurality of different times; and
   a processor configured for determining one or more weighting criteria including a weighted average of the plurality of barometric altitude location measurements based on an estimated reliability of each one of the plurality of location measurements, the weighting criteria including speed of the source and being used for calculating a plurality of target location values based on the plurality of ranges measured by the first sensor and the plurality of barometric altitude locations measured by the second sensor, and for calculating an estimated target location value based on the plurality of target location values weighted according to the weighting criteria.

2. The system of claim 1, wherein calculating the estimated target location based on the plurality of target location values weighted according to the weighting criteria includes generating a weighted average based on the plurality of target location values and the weighting criteria.

3. The system of claim 1, wherein the first sensor detects a range above ground level, the second sensor detects an altitude above mean sea level (MSL), and the estimated target location value includes an MSL altitude of the target.

4. The system of claim 1, the first sensor is a LIDAR sensor system and the second sensor is an altitude sensor.

5. The system of claim 1, further comprising a third sensor for detecting a plurality of secondary location measurements of the source, said plurality of secondary location measurements corresponding to an altitude of the third sensor above ground level, wherein the processor is configured to calculate the estimated target location based on the plurality of secondary location measurements.

6. The system of claim 5, wherein the third sensor is radar.

7. The system of claim 1, wherein the first and second sensors are located on an aircraft, the target location is a terrain feature, and the moving among the plurality of locations includes the aircraft flying over terrain.

8. A method of registering a location of a target, comprising:

measuring, by a first sensor, a plurality of ranges from a source to a target, the plurality of ranges based on at least one of the source moving among a plurality of different locations and the first sensor taking measurements at a plurality of different times;

measuring, by a second sensor comprising a barometric altimeter, a plurality of barometric altitude location measurements based on at least one of the source moving among the plurality of different locations and the second sensor obtaining measurements at the plurality of different times;

determining one or more weighting criteria including a weighted average of the plurality of location measurements based on an estimated reliability of each one of the plurality of barometric altitude location measurements, the weighting criteria including speed of the source;

calculating a plurality of target location values for the target based on the plurality of ranges the plurality of barometric altitude location measurements, and the weighting criteria; and calculating an estimated location value of the target based on the plurality of target location values weighted according to the weighting criteria.

9. The method of claim 8, wherein calculating the estimated target location based on the plurality of target location values weighted according to the weighting criteria includes generating a weighted average based on the plurality of target location values and the weighting criteria.

10. The method of claim 8, wherein the first sensor detects a range above ground level, the second sensor detects an altitude above mean sea level (MSL), and the estimated target location value includes an MSL altitude of the target.

11. The method of claim 8, wherein the first sensor is a LIDAR sensor system and the second sensor is an altitude sensor.

12. The method of claim 8, further comprising detecting, by a third sensor, a plurality of secondary location measurements of the source, said plurality of secondary location measurements corresponding to an altitude of the third sensor above ground level, wherein the estimated location value is calculated based on the plurality of secondary location measurements.

13. The method of claim 12, wherein the third sensor is radar.

14. The method of claim 8, wherein the first and second sensors are located on an aircraft, the target location is a terrain feature, and the moving among the plurality of locations includes the aircraft flying over terrain.

15. A vehicle, comprising:

a propulsion system to move the vehicle among a plurality of locations;

a first sensor for measuring a plurality of ranges from the vehicle to a target, the first sensor configured for measuring the plurality of ranges based on at least one of the vehicle moving among a plurality of different locations and the first sensor taking measurements at a plurality of different times;

a second sensor comprising a barometric altimeter for obtaining a plurality of barometric altitude location measurements of the vehicle based on at least one of the vehicle moving among the plurality of different locations and the second sensor obtaining measurements at the plurality of different times; and a processor configured for determining one or more weighting criteria including a weighted average of the plurality of barometric altitude location measurements based on an estimated reliability of each one of the plurality of location measurements, the weighting criteria including speed of the source and being used for calculating a plurality of target location values based on the plurality of ranges measured by the first sensor and the plurality of barometric altitude locations measured by the second sensor, and for calculating an estimated target location value based on the plurality of target location values weighted according to the weighting criteria.

16. The vehicle of claim 15, wherein calculating the estimated target location based on the plurality of target location values weighted according to the weighting criteria includes generating a weighted average based on the plurality of target location values and the weighting criteria.

17. The vehicle of claim 15, wherein the first sensor detects a range above ground level, the second sensor detects an altitude above mean sea level (MSL), and the estimated target location value includes an MSL altitude of the target.

18. The vehicle of claim 15, the first sensor is a LIDAR sensor system and the second sensor is an altitude sensor.

* * * * *